(12) United States Patent
Shirakawa

(10) Patent No.: US 10,042,281 B2
(45) Date of Patent: *Aug. 7, 2018

(54) IMAGE FORMING APPARATUS

(71) Applicant: CANON KABUSHIKI KAISHA, Tokyo (JP)

(72) Inventor: Chihiro Shirakawa, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,679

(22) Filed: Aug. 23, 2017

(65) Prior Publication Data

US 2017/0371268 A1 Dec. 28, 2017

Related U.S. Application Data

(62) Division of application No. 15/363,554, filed on Nov. 29, 2016, now Pat. No. 9,804,522.

(30) Foreign Application Priority Data

Nov. 30, 2015 (JP) .................................. 2015-232709

(51) Int. Cl.
*G03G 15/04* (2006.01)
*G03G 15/043* (2006.01)
*G02B 26/12* (2006.01)

(52) U.S. Cl.
CPC ......... *G03G 15/043* (2013.01); *G02B 26/127* (2013.01)

(58) Field of Classification Search
None
See application file for complete search history.

(56) References Cited

U.S. PATENT DOCUMENTS

| | | | |
|---|---|---|---|
| 2002/0085294 A1 | 7/2002 | Kurosaw | 359/871 |
| 2006/0055917 A1 | 3/2006 | Higashi et al. | 356/237.1 |
| 2013/0155166 A1 | 6/2013 | Watanabe et al. | G02B 26/129 |
| 2015/0092256 A1 | 4/2015 | Ono et al. | G02B 26/12 |
| 2015/0241811 A1 | 8/2015 | Shirahata | G03G 15/043 |

FOREIGN PATENT DOCUMENTS

| | | |
|---|---|---|
| JP | 2000-338442 | 12/2000 |
| JP | 2012-098454 | 5/2012 |
| JP | 2013-111796 | 6/2013 |
| JP | 2013-178477 | 9/2013 |
| JP | 2014-037126 | 2/2014 |

*Primary Examiner* — Thomas Giampaolo, II
(74) *Attorney, Agent, or Firm* — Fitzpatrick, Cella, Harper & Scinto

(57) ABSTRACT

An image forming apparatus includes an optical scanning unit including a rotatable polygonal mirror and a detecting portion; and a controller. A rotation center of the rotatable polygonal mirror is made eccentric with respect to a center of gravity of the rotatable polygonal mirror by 7.5 μm or more. The controller identifies one of reflecting surfaces of the rotatable polygonal mirror as a reference surface by using a signal outputted from the detecting portion for each of the reflecting surfaces of the rotatable polygonal mirror and a period of signals from light beams reflected by consecutive two reflecting surfaces with respect to a rotational direction of the rotatable polygonal mirror.

10 Claims, 9 Drawing Sheets

IMAGE FORMING APPARATUS

This application is a division of application Ser. No. 15/363,554 filed Nov. 29, 2016, currently pending; and claims priority under 35 U.S.C. § 119 to Japan Application 2015-232709 filed in Japan on Nov. 30, 2015; and the contents of all of which are incorporated herein by reference as if set forth in full.

FIELD OF THE INVENTION AND RELATED ART

The present invention relates to an image forming apparatus including an optical scanning device for scanning a photosensitive member with a light beam deflected by a rotatable polygonal mirror.

An optical scanning device for use with a conventional image forming apparatus such as a laser printer optically modulates a laser light beam emitted from a light source depending on an image signal, and the photosensitive member is subjected to deflection scanning with the optically modulated laser light beam by an optical deflector provided with a rotatable polygonal mirror.

In the optical scanning device, a plurality of reflecting surfaces of the rotatable polygonal mirror includes a reflecting surface which is not parallel with a rotational axis in some cases due to cutting accuracy during manufacturing and assembling accuracy during assembling of the rotatable polygonal mirror with the optical scanning device (so-called face inclination (tilt)). In a state in which the face inclination generates, when the photosensitive member is subjected to deflection scanning with the laser light beam, a phenomenon that a scanning position of the laser light beam steadily deviates from a target position generates. Further, it is difficult to process the respective reflecting surfaces in a complete flat surface in cutting processing, so that a curved surface or the like is formed as a part of the reflecting surfaces in some cases. In this state, in the case where the laser light beam is used for the deflection scanning. A phenomenon that the scanning position of the laser light beam steadily deviates from a target position with respect to a main scan direction for each of the respective reflecting surfaces generates (so-called jittering). As a method of reducing these deviations, cutting (process) accuracy may only be required to be improved, but there is a problem that a processing cost increases.

In order to solve the above-described problems, Japanese Laid-Open Patent Application (JP-A) 2000-338442 has proposed a technique in which a reflecting surface of a rotatable polygonal mirror is identified and a variation in interval between scanning lines is electrically corrected for each of reflecting surfaces. In order to make correction for each of the reflecting surfaces, there is a need to identify that deflection scanning is made at what reflecting surface. According to the technique, by using a single reference position mark provided at a rotatable portion of the optical deflector and a detecting means for detecting the reference position mark, it is possible to identify the reflecting surface every rotation of the rotatable polygonal mirror.

However, in the technique of JP-A 2000-338442, the following problem occurred. The optical scanning device is upsized by providing the reference position mark and the detecting means for detecting the reference position mark. Further, a material cost and a production cost due to complication of a manufacturing step increase.

SUMMARY OF THE INVENTION

A principal object of the present invention is to provide an image forming apparatus capable of simply identifying a reflecting surface (reflecting facet) of a rotatable polygonal mirror without increasing a size and costs of an optical scanning device.

According to an aspect of the present invention, there is provided an image forming apparatus comprising: an optical scanning unit configured to scan a photosensitive member with a light beam, wherein the optical scanning unit includes a rotatable polygonal mirror configured to deflect the light beam emitted from a light source and a detecting portion configured to detect the light beam deflected by the rotatable polygonal mirror; and a controller configured to control, on the basis of a detected signal by the detecting portion, a scanning start position of the photosensitive member with the light beam deflected by the rotatable polygonal mirror, wherein a rotation center of the rotatable polygonal mirror is made eccentric with respect to a center of gravity of the rotatable polygonal mirror by 7.5 μm or more, and wherein the controller identifies one of reflecting surfaces of the rotatable polygonal mirror as a reference surface by using a signal outputted from the detecting portion for each of the reflecting surfaces of the rotatable polygonal mirror and a period of signals from light beams reflected by consecutive two reflecting surfaces with respect to a rotational direction of the rotatable polygonal mirror.

Further features of the present invention will become apparent from the following description of exemplary embodiments with reference to the attached drawings.

DESCRIPTION OF THE EMBODIMENTS

Embodiments of the present invention will be described specifically with reference to the drawings. However, dimensions, materials, shapes and relative arrangement of constituent elements described in the following embodiments are not intended such that the scope of the present invention is limited only thereto unless otherwise specified.

First Embodiment

An image forming apparatus including an optical scanning device according to this embodiment will be described. In the following description, first, the image forming apparatus will be described and then the optical scanning device will be specifically described.

Figure 1:
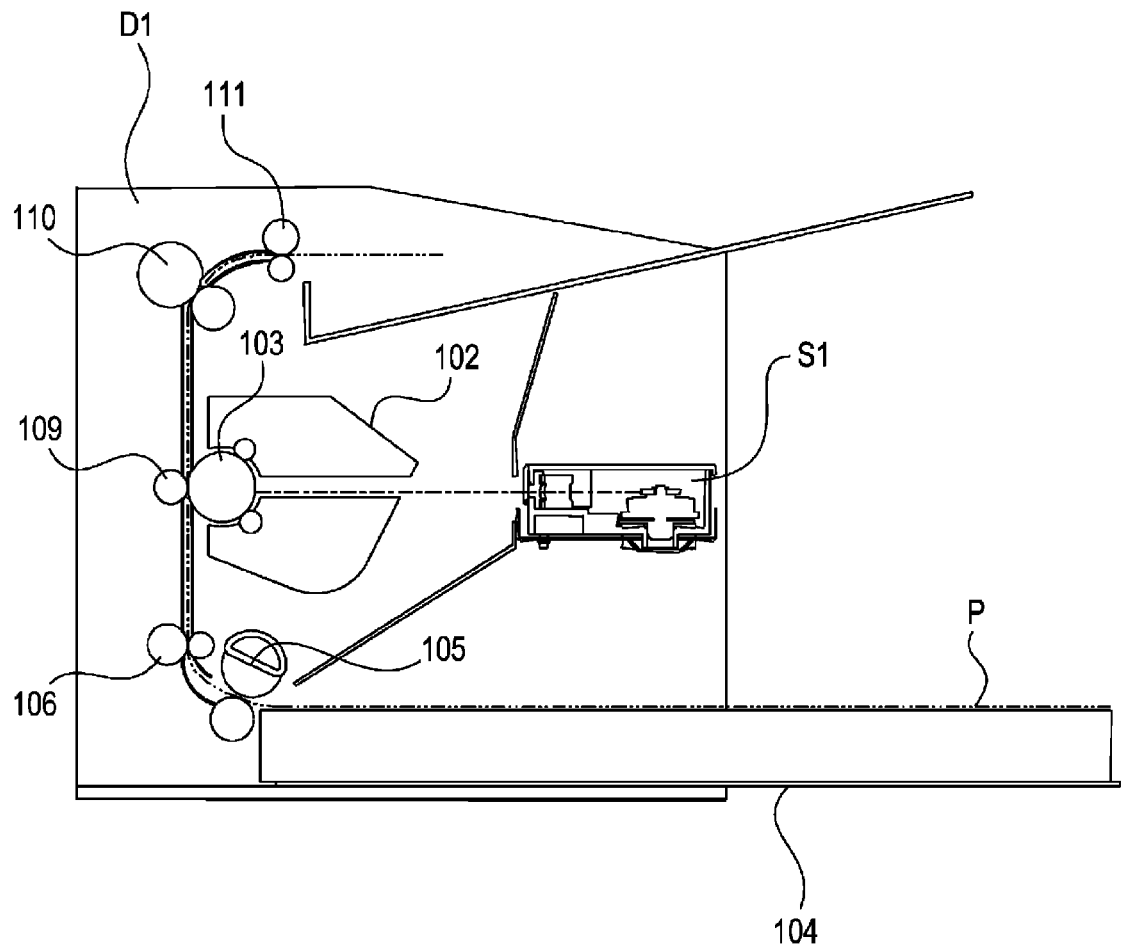
FIG. 1 is a schematic sectional view of an image forming apparatus according to First Embodiment.

FIG. 1 is a schematic sectional view of an image forming apparatus D1 including an optical scanning device S1. The image forming apparatus D1 is provided with the optical scanning device S1, and an image bearing member such as a photosensitive drum is scanned by the optical scanning device S1, and then an image is formed on a recording material such as recording paper on the basis of a scanned image. As shown in FIG. 1, a laser light beam on the basis of image information is emitted from the optical scanning device S1 as an exposure means, and a photosensitive drum 103 as the image bearing member (photosensitive member) incorporated in a process cartridge 102 is scanned with this light beam. The photosensitive drum 103 is exposed to the light beam, so that an electrostatic latent image is formed on the photosensitive drum 103. The electrostatic latent image is visualized with toner by a developing means in the process cartridge 102. The process cartridge 102 integrally includes the photosensitive drum 103 and as process means actable on the photosensitive drum 103, such as a charging means and the developing means.

On the other hand, a recording material P stacked on a recording material stacking plate 104 is fed by a feeding roller 105 while being separated one by one, and then is conveyed toward a downstream side by a conveying roller 106. Onto the conveyed recording material P, the toner image formed on the photosensitive drum 103 is transferred by a transfer roller 109. The recording material P on which this unfixed toner image is formed is further fed toward the downstream side and is heated by a fixing device 110 including a heating member therein. As a result, the toner image is heat-fixed on the recording material P. Thereafter, the recording material P is discharged to an outside of the image forming apparatus by a discharging roller 111.

In this embodiment, as the process means actable on the photosensitive drum 103, the charging means and the developing means are integrally assembled with the photosensitive drum 103 into the process cartridge 102, but the respective process means may also be constituted as separate members from the photosensitive drum 103.

Figure 2:
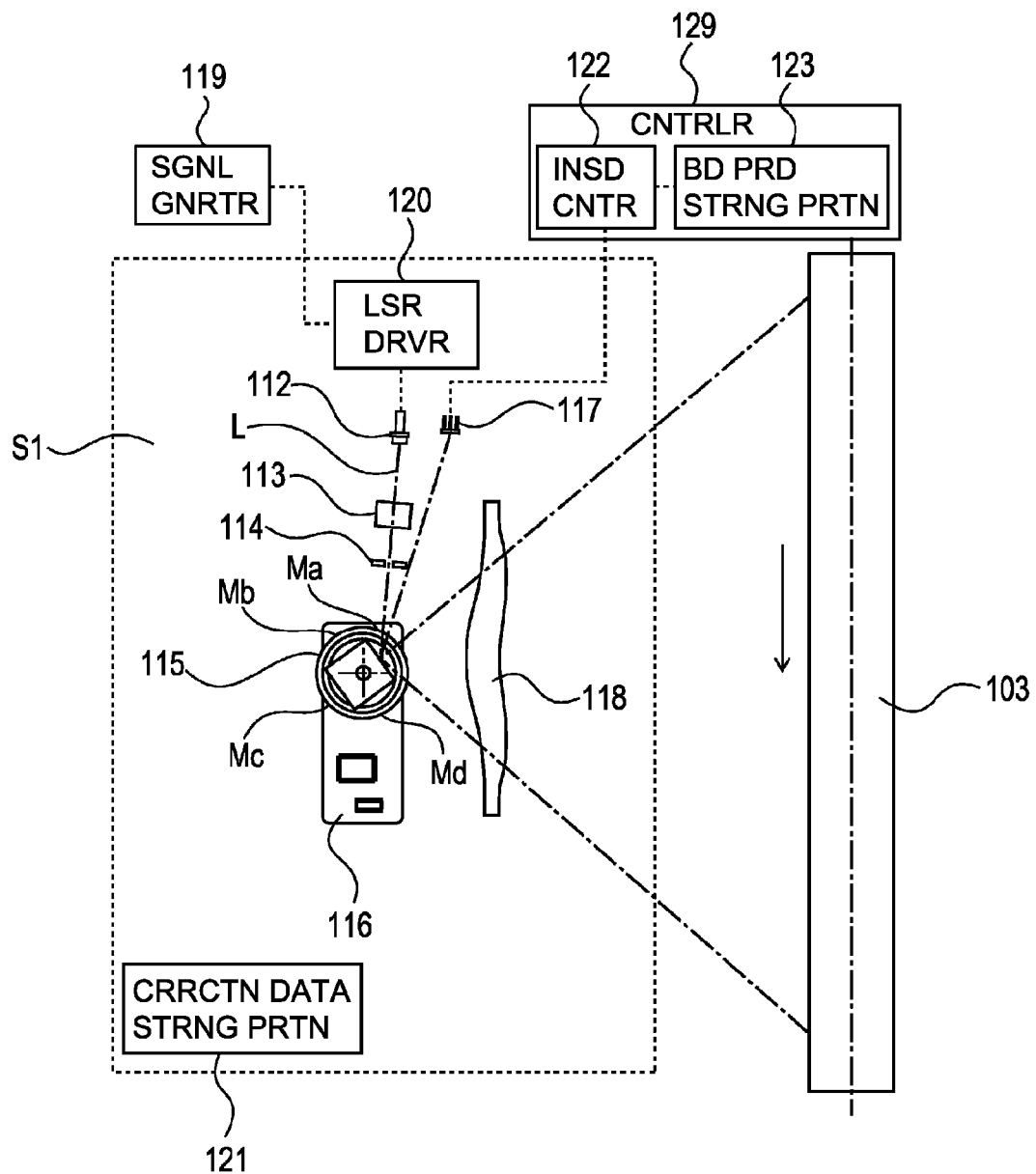
FIG. 2 is a schematic view showing an optical scanning device and an exposure controller in First Embodiment.

Next, the optical scanning device S1 will be described with reference to FIG. 2. FIG. 2 is an x illustration showing a constitution of the optical scanning device S1 and an exposure controller.

In FIG. 2, the optical scanning device S1 includes a semiconductor laser (light source) 112 for emitting a laser light beam, an anamorphic collimator lens 113 prepared by integrally molding a collimator lens and a cylindrical lens, an aperture step 114, a rotatable polygonal mirror 115, a light reflector 116 for rotationally driving the rotatable polygonal mirror 115, a writing position synchronizing signal detecting sensor (BD sensor) 117 using a photo-sensor and an fθ lens (scanning lens) 118.

In FIG. 2, an image signal generating portion 119 forms an image signal, and a laser driving portion 120 drives the light source (semiconductor laser) 112. An inside counter 122 for measuring an output interval (BD period) of a BD signal outputted from the BD sensor 117, and a BD period storing portion 123 for storing the output period of the BD signal. A controller 129 includes the inside counter 122 and the BD period storing portion 123 and identifies a reflecting surface as a reference surface of the rotatable polygonal mirror 115 on the basis of the BD signal as described later.

In the above-described constitution, a laser light beam L emitted from the light source 112 is changed into a substantially converging beam in a main scanning cross-section and is changed into a converging beam in a sub-scanning cross-section by the anamorphic collimator lens 113. Then, the laser light beam L passes through the aperture stop 114 and a light beam width is limited, so that the laser light beam L is formed as a substantially line image (a longitudinal line image with respect to a main scan direction) on a reflecting surface M of the rotatable polygonal mirror 115. The rotatable polygonal mirror 115 has a plurality of reflecting surfaces. In this embodiment, the rotatable polygonal mirror 115 having four reflecting surfaces Ma, Mb, Mc, Md is shown as an example. The laser light beam L is used for deflection scanning by rotating the rotatable polygonal mirror 115. The laser light beam L is reflected by each of the reflecting surfaces Ma, Mb, Mc, Md of the rotatable polygonal mirror 115 and is incident on the BD sensor 117. At this time, the BD (beam detecting) sensor (position detecting means) 117 outputs a signal (BD signal) to the controller (control means) 129. The controller 129 uses timing of the BD signal outputted for each of the reflecting surfaces as synchronization detection timing of a writing signal with respect to the main scan direction. That is, the controller 129 controls, on the basis of a detected signal by the BD sensor 117, a scanning start position of the photosensitive drum with each light beam L deflected by the plurality of reflecting surfaces M.

The signal detection by the BD sensor 117 is made at each of the reflecting surface Ma, Mb, Mc, Md of the rotatable polygonal mirror 115. At that time, an output interval (BD period) of the BD signal is measured by the inside counter 122 of the controller 129 and is stored in the BD period storing portion 123 in advance. Then, the laser light beam L enters the fθ lens 118. The fθ lens 118 is designed so that the laser light beam L is focused so as to form a spot on the photosensitive drum and so that a scanning speed of the spot is maintained at an equal speed. In order to obtain such a characteristic of the fθ lens 118, the fθ lens 118 is formed with an aspherical lens. The laser light beam L passed through the fθ lens 118 is formed as an image on the photosensitive drum 103 and thus the photosensitive drum 103 is scanned with the laser light beam L.

By the rotation of the rotatable polygonal mirror 115, the laser light beam L is used for the deflection scanning, so that scanning of the photosensitive drum 103 in a main scan direction with the laser light beam L is made. Further, scanning in a sub-scan direction is made by rotationally driving the photosensitive drum 103 about a cylindrical axis thereof. Thus, on the surface of the photosensitive drum 103, an electrostatic latent image is formed. Here, a scanning direction (axial direction of the photosensitive drum) of the photosensitive drum with the laser light beam L by the rotation of the rotatable polygonal mirror 115 is the main scan direction. On the other hand, a scanning direction which is perpendicular to the main scan direction and along which sub-scanning is made by the rotational drive of the photosensitive drum around the cylindrical axis of the photosensitive drum is a sub-scan direction.

The optical scanning device S1 includes a correction value data storing portion (semiconductor memory) 121. In the correction value data storing portion 121, correction value data on the basis of individually different various pieces of characteristic information are stored in advance during factory shipment. In the correction value data storing portion 121, principally, laser light beam irradiation position information on the photosensitive drum such as jitters associated with the respective reflecting surfaces measured before the factory shipment and simple information on how to identify the reference surface using what identifying method are associated with each other and are written. Specifically, during inspection before the factory shipment, the above-described irradiation position information is measured for each of the reflecting surfaces of the rotatable polygonal mirror 115 simultaneously with measurement of the BD period for each of the reflecting surfaces. From the information of the measured BD periods, of the plurality of reflecting surfaces of the rotatable polygonal mirror 115, a reflecting surface (facet) Facet 1 reference surface is identified.

Pieces of irradiation position information of the respective reflecting surfaces (for example, 4 pieces of the irradiation position information when the rotatable polygonal mirror has 4 reflecting surfaces) are assigned to the respective reflecting surfaces in the order of a rotational direction, and of the plurality of reflecting surfaces, determination that which reflecting surface corresponding to the reflecting surface Facet 1 is made. These pieces of the irradiation position information and the information on the reflecting surface Facet 1 are stored in advance in the correction value data storing portion 121.

Incidentally, a constitution in which the optical scanning device S1 is not provided with the semiconductor memory as the correction value data storing portion may also be employed. In this case, the above-described information is written in a two-dimensional bar code or the like and is pasted on the optical scanning device S1 in advance. Then, during assembling of the optical scanning device S1 with the image forming apparatus D1, it is only required that information of the bar code is transferred by using a bar-code reader to an unshown information storing portion provided in the image forming apparatus D1.

Figure 3:
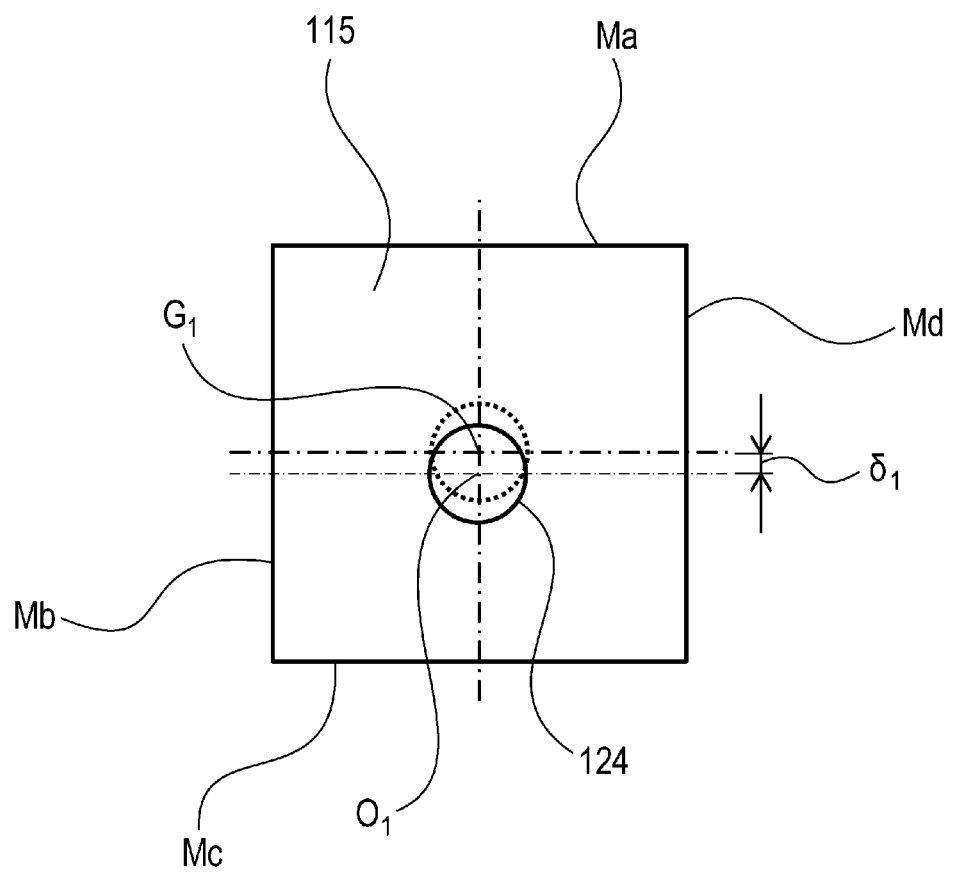
FIG. 3 is a schematic view of a rotatable polygonal mirror in First Embodiment.
Figure 4:
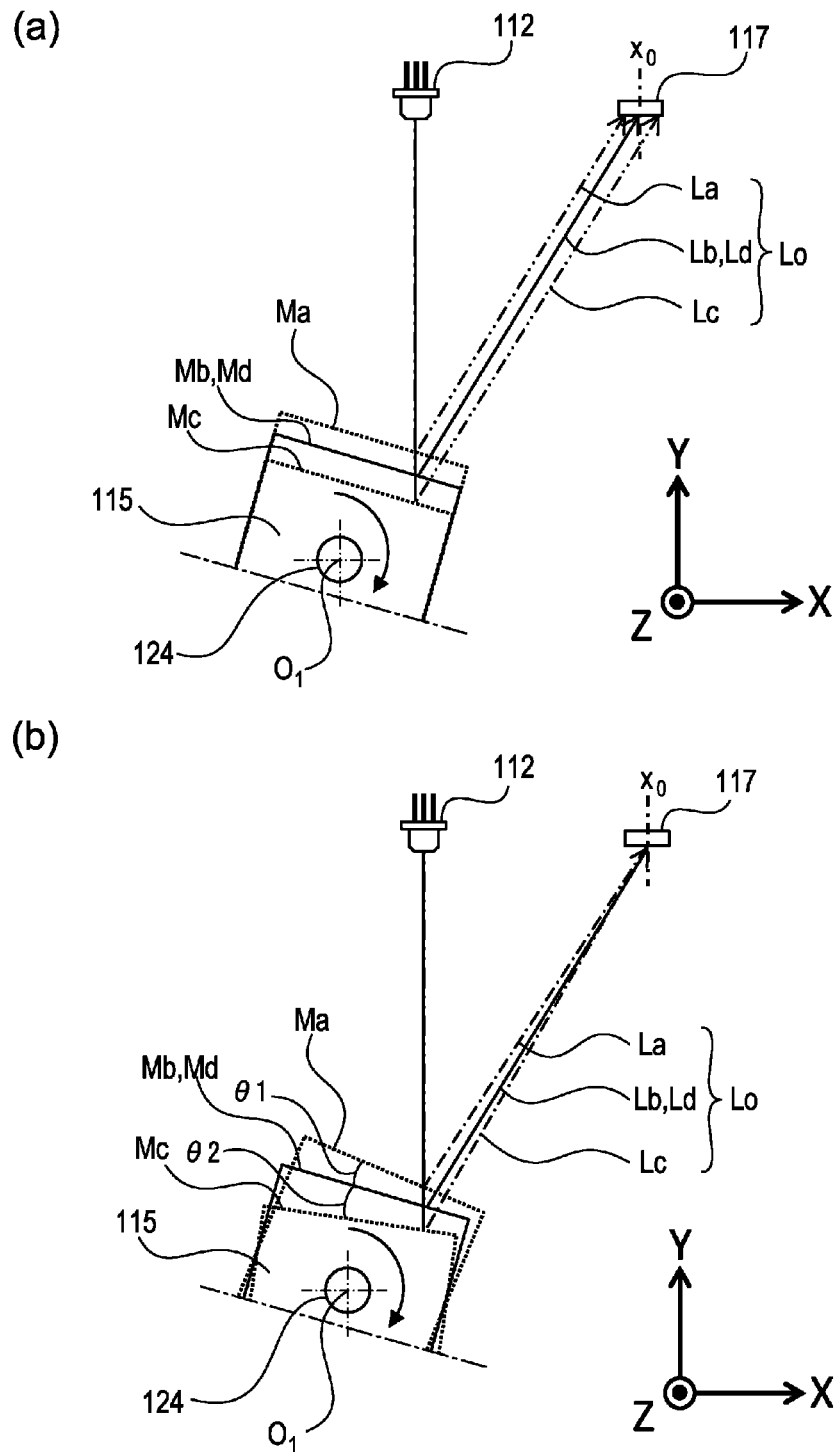
In FIG. 4, (a) and (b) are schematic views each for illustrating a relationship between positions of reflecting surfaces and reflected states of light beams by the rotatable polygonal mirror in First Embodiment.
Figure 5:
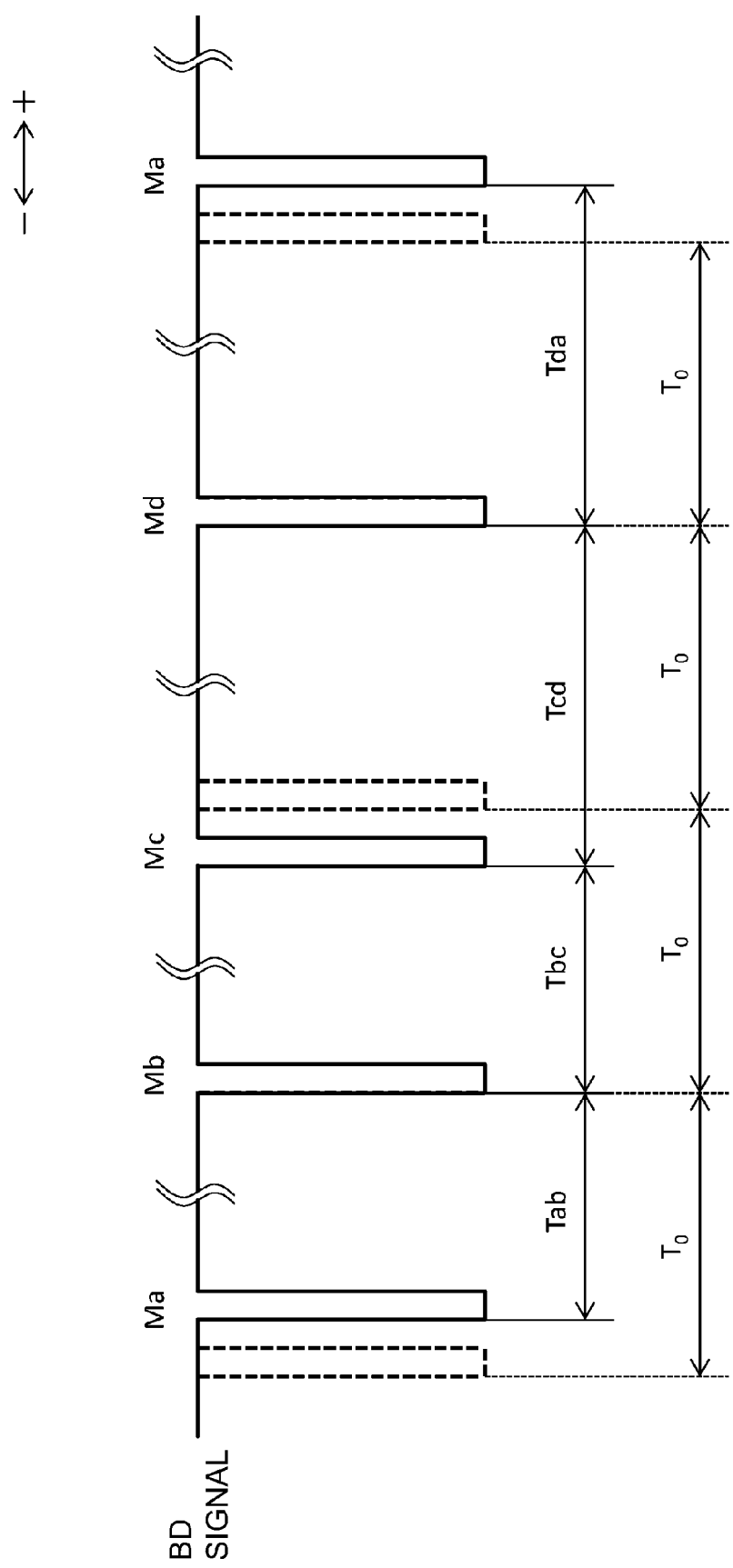
FIG. 5 is a schematic view showing an output waveform of a BD signal in First Embodiment.
Figure 6:
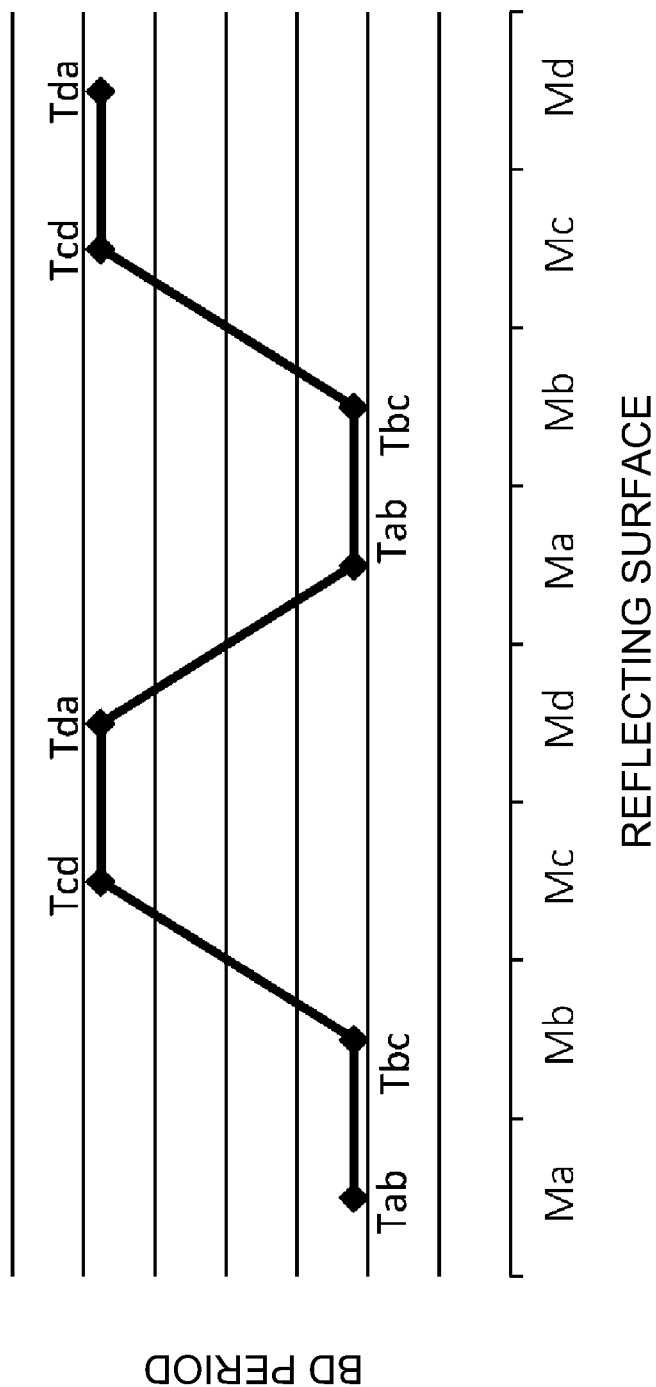
FIG. 6 is a schematic view showing an example of a BD signal period in First Embodiment.

Next, a constitution of identifying a single reflecting surface (reference surface) of the plurality of reflecting surfaces will be described with reference to FIGS. 3 to 6. FIG. 3 is an illustration of a constitution of the optical scanning device S1 as seen in a rotational axis direction of a shaft hole of the rotatable polygonal mirror. In FIG. 4, (a) and (b) are schematic views each for illustrating a relationship between positions of reflecting surfaces of the rotatable polygonal mirror and a reflection states of light beams. FIG. 5 is a schematic view showing an output waveform of the BD signal. FIG. 6 is a schematic view showing an example of the BD signal period.

Identification of the single reflecting surface (reference surface) from the plurality of reflecting surfaces is made by the controller 129 on the basis of the detected signal from the BD sensor 117. In this embodiment, by a simple constitution shown below, the identification of the reflecting surface as the reference surface by the controller 129 is realized.

As shown in FIG. 3, the rotatable polygonal mirror 115 is positioned by engaging a shaft hole 124 provided in the rotatable polygonal mirror 115 with a rotation shaft of the optical deflector 116 for rotationally driving the rotatable polygonal mirror 115. The rotation shaft of the optical deflector 116 transmits a rotational force to the rotatable polygonal mirror 115 via the shaft hole 124. A rotation center of the shaft hole 124 and a rotation center of the rotation shaft coincide with each other. On the other hand, the rotatable polygonal mirror 115 is provided so that the rotation center of the shaft hole 124 is eccentric to a center of gravity $G_1$ of the rotatable polygonal mirror 115. In this embodiment, the rotatable polygonal mirror 115 is disposed so that the rotation center of the shaft hole 124 is positioned so as to shift from the center of gravity $G_1$ in a direction toward the reflecting surface Mc by an eccentricity amount $\delta_1$. That is, the shaft hole 124 provided in the rotatable polygonal mirror 115 has the rotation center which does not pass through the center of gravity $G_1$ of the rotatable polygonal mirror 115. Incidentally, eccentricity (eccentric state) refers to a state in which the center of gravity $G_1$ of the rotatable polygonal mirror 115 and the center (i.e., a rotation center $O_1$) of the shaft hole 124 are not coincide with each other.

A state in which light beams Lo reflected by the reflecting surfaces Ma, Mb, Mc, Md of the rotatable polygonal mirror 115 are incident on the BD sensor 117 will be described. In the case where the reflecting surfaces Ma, Mb, Mc, Md of the rotatable polygonal mirror 115 have the same angle with respect to the light source 112, (a) of FIG. 4 shows optical paths when the light beams La, Lb, Lc, Ld are incident on the BD sensor 117. The light beams La, Lb, Lc, Ld are the light beams Lo reflected by the reflecting surfaces Ma, Mb, Mc, Md, respectively. During rotation, by eccentricity of the rotatable polygonal mirror 115, compared with the reflecting surfaces Mb, Md which are parallel with an eccentricity direction, the reflecting surface Ma spaces from the rotation center $O_1$ and the reflecting surface Mc approaches the rotation center $O_1$. As a result, with respect to an irradiation position $X_0$ of the light beams Lb Ld on the BD sensor 117, the light beam La shifts in a -X direction on the BD sensor 117 and the light beam Lc shifts in a +X direction on the BD sensor 117.

Here, BD signals by the BD sensor 117 are outputted at the times when the respective light beams La, Lb, Lc, Ld pass through the same irradiation position $X_0$ on the BD sensor 117. Therefore, as shown in (b) of FIG. 4, angles of the respective reflecting surfaces Ma, Mb, Mc, Md at the times when the BD signals are outputted are different from each other. An angle of rotation of the rotatable polygonal mirror 115 is, in the case where the rotational direction (an arrow direction, the clockwise direction) of the rotatable polygonal mirror 115 is positive, with respect to the reflecting surfaces Mb, Md, the reflecting surface Ma is larger in angle by an angle $\theta_1$ and the reflecting surface Mc is smaller in angle by an angle $\theta_2$. Thus, the angle of rotation of the rotatable polygonal mirror 115 (i.e., angles of the respective reflecting surfaces at the times of output of the BD signals) is different, and therefore timing values at which the BD signals are outputted are different from each other.

An output waveform of the BD signals corresponding to the respective reflecting surfaces will be described with reference to FIG. 5. In FIG. 5, a solid line represents the output waveform of the BD signals outputted when the light beams La, Lb, Lc, Ld reflected by the respective reflecting surfaces of the rotatable polygonal mirror which is in the eccentric state are incident on the BD sensor 117. On the other hand, in FIG. 5, a broken line represents the output waveform of phantom BD signals outputted when the image forms La, Lb, Lc, Ld reflected by the respective reflecting surfaces of the rotatable polygonal mirror which is not in the eccentric state are incident on the BD sensor 117.

As shown in FIG. 5, a time Tab from the BD signal outputted at the reflecting surface Ma to the BD signal outputted at the reflecting surface Mb is defined as a BD period of the reflecting surface Ma. That is, a time from the BD signal outputted at a first reflecting surface to the BD signal outputted at a second reflecting surface which is consecutive to the first reflecting surface and which is positioned upstream of the first reflecting surface with respect to the rotational direction of the rotatable polygonal mirror is defined as a BD period of the first reflecting surface. In the following, also for the reflecting surfaces Mb, Mc, Md, similar definition is applied, so that BD periods of the reflecting surfaces Mb, Mc, Md are defined as Tbc, Tcd, Tda, respectively. Incidentally, BD periods between consecutive reflecting surfaces of the rotatable polygonal mirror in the rotational direction are the same, and this phantom BD period is a time $T_0$. The reflecting surface Ma is larger in angle of rotation of the rotatable polygonal mirror at the time of output of the BD signal than the reflecting surfaces Mb, Md by the angle θ1, and therefore timing of output of the BD signal is later than that of the reflecting surfaces, Mb, Md which are parallel with the eccentricity direction. Therefore, the BD period Tab of the reflecting surface Ma is shorter than the BD periods of the reflecting surfaces Mb, Md which are not in the eccentric state. On the other hand, the reflecting surface Mc is smaller in angle of rotation of the rotatable polygonal mirror at the time of output of the BD signal than the reflecting surfaces Mb, Md by the angle θ2, and therefore timing of output of the BD signal is earlier than that of the reflecting surfaces, Mb, Md which are parallel with the eccentricity direction. Therefore, the BD period Tab of the reflecting surface Mc is longer than the BD periods of the reflecting surfaces Mb, Md which are not in the eccentric state.

From the above, the BD periods Tab, Tbc, Tcd, Tda of the respective reflecting surfaces Ma, Mb, Mc, Md are in a relationship of Tab=Tbc<Tcd=Tda.

FIG. 6 shows the BD periods of the respective reflecting surfaces of the rotatable polygonal mirror 115. The output waveform of the BD periods is such that the short BD periods and the long BD periods continue two times and appear alternately. Here, from the plurality of reflecting surfaces of the rotatable polygonal mirror, in order to identify a single reflecting surface as a reference surface, there is a need to detect a peculiar value from the BD periods. Therefore, the controller 129 in the image forming apparatus D1 detects a signal for each of the plurality of reflecting surfaces outputted from the BD sensor 117, and the reflecting surface as the reference surface of the plurality of reflecting surfaces is identified using a signal period between consecutive reflecting surfaces in the rotational direction of the rotatable polygonal mirror 115. Here, the consecutive reflecting surfaces in the rotational direction of the rotatable polygonal mirror 115 are the reflecting surface Ma as the first reflecting surface and the reflecting surface Mb as the second reflecting surface consecutive to the reflecting surface Ma, and also the reflecting surfaces Mb, Mc, the reflecting surfaces Mc, Md and the reflecting surfaces Md, Ma are in the same relationship as the relationship between the reflecting surfaces Ma, Mb. Further, the signal period between the consecutive reflecting surfaces is a period from a signal of the first reflecting surface to a signal of the second reflecting surface consecutive to the first reflecting surface.

In this embodiment, on the basis of the signals from the BD sensor 117, the controller 129 calculates a difference between consecutive two BD periods and detects a minimum value of the difference, and then uses the detected value as a peculiar value for identifying the single reflecting surface as the reference surface. Of the consecutive BD periods used for the difference when the peculiar value is determined, the reflecting surface having the second BD period is used as the reflecting surface Facet 1 as the reference surface. In this embodiment, a difference value between times (Tbc−Tcd) in which the difference value between consecutive BD periods is a minimum (not absolute value) is used as the peculiar value, and of the consecutive BD periods, the reflecting surface Mc having the BD period is used as the reflecting surface Facet 1 as the reference surface.

In this embodiment, the minimum value of the difference between the consecutive BD periods is detected and used as the peculiar value for identifying the reflecting surface, but the present invention is not limited thereto. For example, a maximum value of the difference between the consecutive BD periods or the like value may also be detected and used as the peculiar value for identifying the reflecting surface.

Further, in this embodiment, the difference value between the consecutive BD periods is used as the peculiar value for identifying the reflecting surface, but the present invention is not limited thereto. For example, the peculiar value for identifying the reflecting surface may also be detected from a maximum or a minimum of the BD periods.

As described above, according to this embodiment, it is possible to identify the reflecting surface Facet 1 without increasing a size of the optical scanning device due to provision of the reference position mark and the detecting means for detecting the reference position mark and without increasing a material cost and a production cost due to complication of a manufacturing step.

Figure 7:
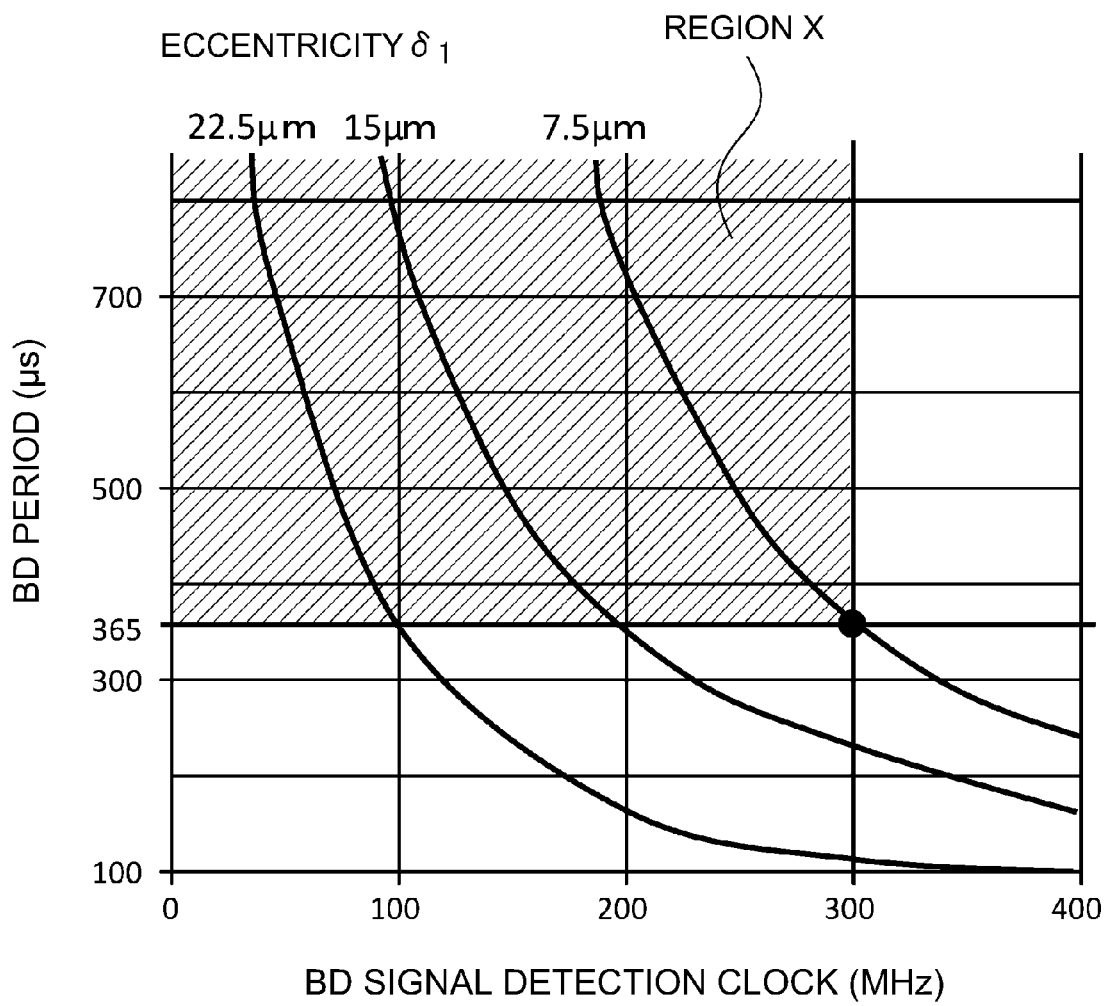
FIG. 7 is a graph showing a relationship among an eccentricity amount, a BD period and a BD signal detection clock in First Embodiment.

FIG. 7 is a graph showing a relationship among the BD period, a BD signal detection clock and the eccentricity amount $δ_1$ in which the increases in cost are not caused. A region X shows a range of a rotational frequency of the optical deflector in the specifications of the image forming apparatus and an upper limit of the BD signal detection clock at which the increases in cost are not caused. The eccentricity amount $δ_1$ necessary to identify the reflecting surface Facet 1 is determined by the BD period and the BD signal detection clock. The BD signal detection clock is resolving power when the value of the BD period is converted from an analog value to a digital value. With a shorter BD period, a difference in BD period between the reflecting surfaces becomes smaller, so that it is difficult to detect the peculiar value, and therefore the necessary eccentricity amount $δ_1$ becomes larger. In the case of the rotatable polygonal mirror having the 4 reflecting surfaces, the largest rotational frequency of the optical deflector in the specifications of the image forming apparatus is about 41,000 $min^{-1}$, and therefore the shortest BD period is about 365 μs. Further, with a larger BD signal detection clock, the BD period difference can be finely calculated, so that the peculiar value can be detected easily, and therefore the necessary eccentricity amount $δ_1$ can be made smaller. However, when the BD signal detection clock is about 300 MHz, there is a need to increase or change the constituent elements such as electronic parts, and therefore in order to avoid the increases in cost, about 300 MHz is an upper limit of the BD signal detection clock. Accordingly, in order to reliably identify the reflecting surface Facet 1 without increasing the costs, the eccentricity amount $δ_1$ may preferably be not less than 7.5 μm at which the reflecting surface Facet 1 can be identified at the BD signal detection clock of 300 MHz and at the BD period of 365 μs. Further, in order to suppress deterioration of an image quality due to the eccentricity, the eccentricity amount $δ_1$ may preferably be not more than 250 μm. Therefore, the eccentricity amount $δ_1$ may preferably fall within a range of 7.5 μm≤$δ_1$≤250 μm.

Further, in this embodiment, as shown in FIG. 5, a constitution in which the rotation center (shaft hole 124) of the rotatable polygonal mirror 115 shifts toward the reflecting surface Mc by the eccentricity amount $δ_1$ is described as an example, but the eccentricity direction is not limited thereto. The eccentricity direction of the rotation center (shaft hole 124) of the rotatable polygonal mirror 115 may also be any direction when the rotation center is in a position eccentric with respect to the center of gravity of the rotatable polygonal mirror (i.e., when the rotation center is not coincide with the center of gravity).

Second Embodiment

Second Embodiment according to the present invention will be described. Constituent elements similar to those described in First Embodiment are represented by the same reference numerals or symbols and will be omitted from description.

In First Embodiment, the constitution in which the rotation center $O_1$ of the shaft hole 124 in which the rotation shaft of the optical deflector is engaged and the rotatable polygonal mirror is positioned is made eccentric with respect to the center of gravity $G_1$ of the rotatable polygonal mirror 115 was described as an example. On the other hand, in this embodiment, a rotation center $O_2$ of a rotation shaft 128 of the optical deflector 116 and a center axis $G_2$ of a shaft hole 127 are not coincide with each other as described below.

Figure 8:
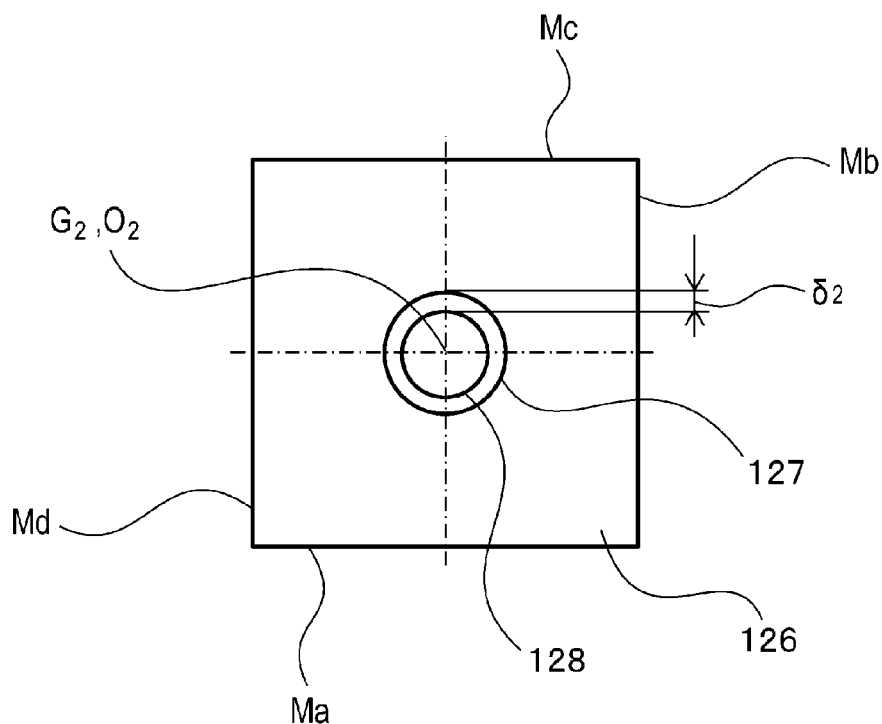
In FIG. 8, (a) and (b) are schematic views each showing a rotatable polygonal mirror in Second Embodiment.
Figure 8:
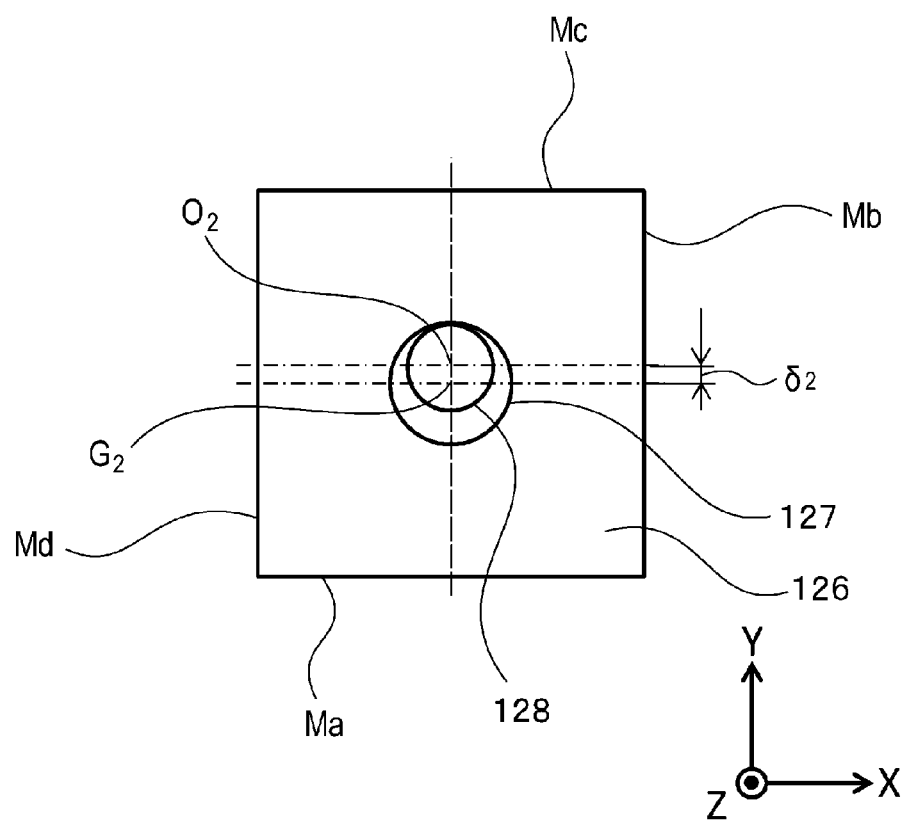

In FIG. 8, (a) and (b) are illustrations of the rotatable polygonal mirror 126 as seen in the rotational axis direction. A radius of the shaft hole 127 of the rotatable polygonal mirror 126 is larger than a radius of the rotation shaft 128 of the optical deflector 116 by $\delta_2$. That is, between the shaft hole 127 provided in the rotatable polygonal mirror 126 and the rotation shaft 128 of the optical deflector, a clearance $\delta_2$ is provided over a full circumference of the rotation shaft 128.

Incidentally, in this embodiment, the center axis $G_2$ of the shaft hole 127 is in the same position as the center of gravity $G_2$ of the rotatable polygonal mirror 126. By the constitution in this embodiment, as shown in (b) of FIG. 8, the rotation center $O_2$ of the rotation shaft 128 and the center of gravity $G_2$ of the rotatable polygonal mirror 126 can be deviated from each other, so that the rotation center of the rotatable polygonal mirror 126 can be made eccentric $\delta_2$ at the maximum. Between the shaft hole 127 and the rotation shaft 128, the clearance $\delta_2$ is provided over the full circumference of the rotation shaft 128, and therefore the rotation center (center axis $G_2$ of the shaft hole 127) of the rotatable polygonal mirror 126 can be made eccentric with respect to the rotation center $O_2$ of the rotation shaft 128 in any direction on an XY plane. As a result, similarly as in First Embodiment, it is possible to identify the reflecting surface Facet 1 as the reference surface by using the peculiar value of the BD period.

Figure 9:
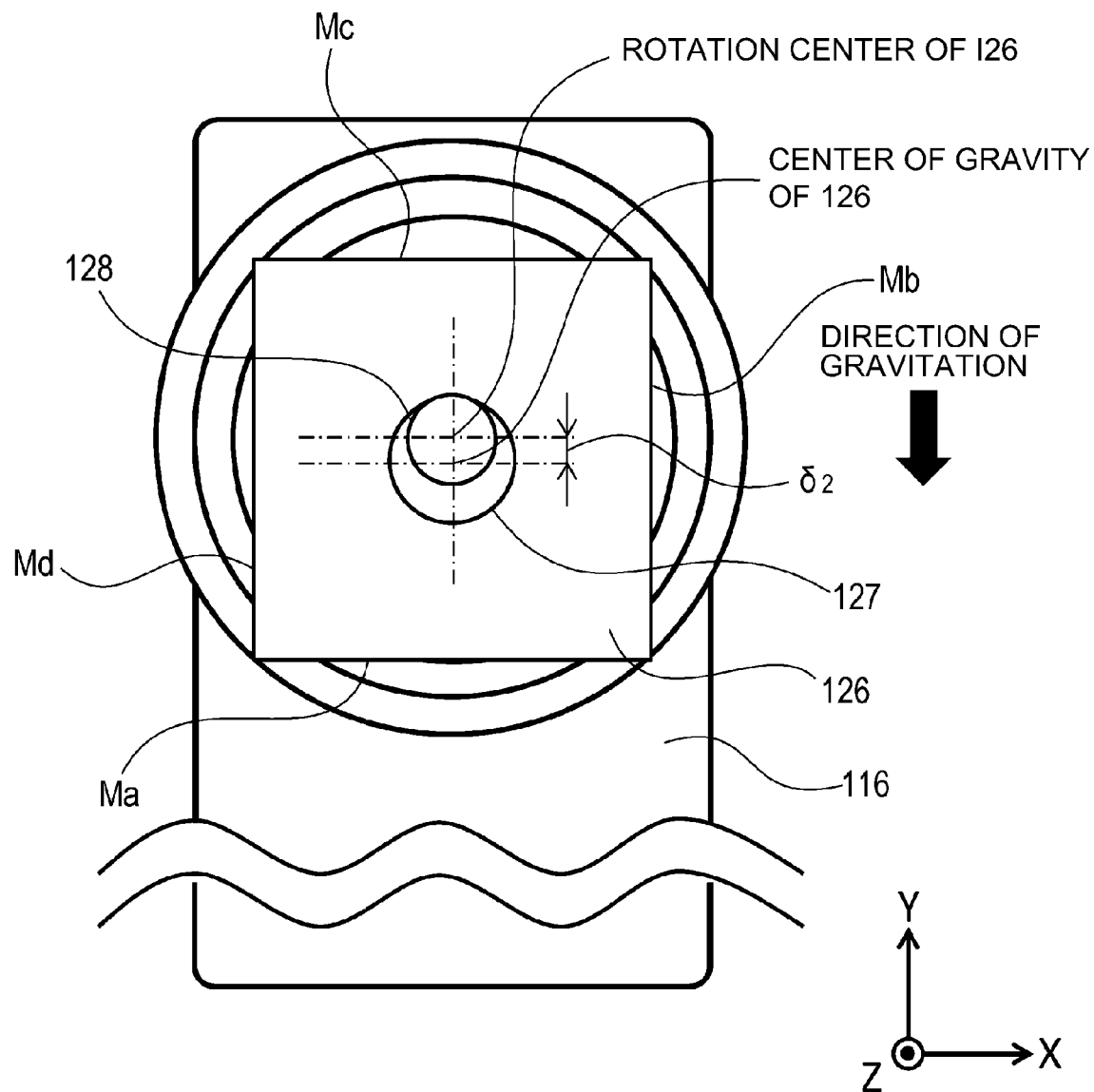
FIG. 9 is a schematic view for illustrating an assembling method of the rotatable polygonal mirror with an optical deflector in Second Embodiment.

Next, with reference to FIG. 9, an assembling method of the rotatable polygonal mirror 126 will be described. The rotation shaft 128 of the optical deflector 116 provided so that −Y direction is a direction (direction of gravitation) in which gravitation acts is inserted into the shaft hole 127 of the rotatable polygonal mirror 126. The rotatable polygonal mirror 126 shifts so that the center of gravity $G_2$ thereof shifts from the rotation center $O_2$ in the −Y direction by its own weight. In that state, the rotatable polygonal mirror 126 is urged in −Z direction by using an unshown urging member, so that the rotatable polygonal mirror 126 is fixed to the optical deflector 116. As a result, the rotation center $O_2$ of the rotatable polygonal mirror 126 can be placed in a state eccentric in Y direction relative to the center of gravity $G_2$ of the rotatable polygonal mirror 126. When the rotatable polygonal mirror 126 rotates, a relationship between the rotatable polygonal mirror 126 and the rotation shaft 128 is kept in a state satisfying the relationship shown in (b) of FIG. 8.

In this embodiment, the clearance $\delta_2$ is provided between the shaft hole 127 and the rotation shaft 128, and therefore it is possible to reduce a risk of deformation of the shaft hole 127, the rotation shaft 128 and the rotatable polygonal mirror 126 due to control between the shaft hole 127 and the rotation shaft 128 when the rotatable polygonal mirror 126 is mounted to the optical deflector 116.

Further, there is no need to control a relative position between the shaft hole 127 and the rotation shaft 128 with high accuracy, and therefore cost reduction can be realized by reducing the number of steps.

As described above, according to this embodiment, the reflecting surface Facet 1 can be identified with a low cost while suppressing the deformation of the rotatable polygonal mirror 126, the rotation shaft and the like.

Further, the shape of the shaft hole 127 is not limited to a circular shape, but for example, in the case where the eccentricity direction is determined, the shaft hole shape may also be an elongated hole shape.

Further, as the means for making the rotation center $O_2$ of the rotatable polygonal mirror 126 eccentric, the gravitation is used, but the present invention is not limited thereto. The rotation center $O_2$ may only be required to be made eccentric by, e.g., urging the rotatable polygonal mirror 126 in any direction on the XY plane by the unshown urging member.

Further, the direction of gravitation is −Y direction, but the present invention is not limited thereto. When the rotatable polygonal mirror 126 can be mounted to the optical deflector 116 by making the rotation center $O_2$ eccentric, the direction of gravitation may also be any direction.

OTHER EMBODIMENTS

In First and Second Embodiments, as the image forming apparatus D1, a monochromatic image forming apparatus was described, but the present invention is not limited thereto. Also in a color image forming apparatus, image formation may only be required to be effected in a manner that information corresponding to each of colors is stored in the correction value data storing portion in advance and then correction values corresponding to the respective reflecting surfaces for the respective colors are set by identifying the reflecting surface by the above-described method. Incidentally, in the color image forming apparatus, by an arrangement or the like of the optical system, the irradiation position deviation amount depends on the accuracy of the rotatable polygonal mirror, so that when a constitution in which the deviation amounts for the respective colors are uniform or the deviation amount for a certain color is associated with that for another color is employed, the correction data stored in the storing portion may be a single data. in the case of any constitution inclusive of the above constitutions, in order to assign the correction value data depending on the respective reflecting surfaces with accuracy, as described above, the constitution for identifying the reflecting surface may only be required to be employed.

The constitution in which the number of surfaces (reflecting surfaces) of the rotatable polygonal mirrors 115, 201 is 4 was described as an example, but the number of the reflecting surfaces is not limited thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232709 filed on Nov. 30, 2015, which is hereby incorporated by reference herein in its entirety.

What is claimed is:

1. An image forming apparatus comprising:
an optical scanning unit configured to scan a photosensitive member with a light beam, wherein said optical scanning unit includes a rotatable polygonal mirror configured to deflect the light beam emitted from a light source and a detecting portion configured to detect the light beam deflected by said rotatable polygonal mirror; and
a controller configured to control, on the basis of a detected signal by said detecting portion, a scanning start position of the photosensitive member with the light beam deflected by said rotatable polygonal mirror,
wherein a rotation center of said rotatable polygonal mirror is made eccentric with respect to a center of gravity of said rotatable polygonal mirror by an eccentricity amount of 7.5 μm or more, and
wherein said controller identifies one of plural reflecting surfaces of said rotatable polygonal mirror as a reference surface by using a period of light beam detection signals from light beams reflected by two consecutive reflecting surfaces with respect to a rotational direction of said rotatable polygonal mirror.

2. The image forming apparatus according to claim 1, wherein said controller sets correction values corresponding to the respective reflecting surfaces, and wherein said apparatus forms an image in accordance with the correction values.

3. The image forming apparatus according to claim 1, wherein a clearance is provided between a shaft hole provided in said rotatable polygonal mirror and a rotation shaft for transmitting a rotational force to said rotatable polygonal mirror via the shaft hole.

4. The image forming apparatus according to claim 1, wherein the eccentricity amount is 7.5 μm or more to 250 μm or less.

5. The image forming apparatus according to claim 1, further comprising a correction value data storing portion configured to store irradiation position information and information of the reference surface.

6. An image forming apparatus comprising:
an optical scanning unit configured to scan a photosensitive member with a light beam, wherein said optical scanning unit includes an optical deflector configured to deflect the light beam emitted from a light source and a detecting portion configured to detect the light beam deflected by said optical deflector; and
a controller configured to control, on the basis of a detected signal by said detecting portion, a scanning start position of the photosensitive member with the light beam deflected by said optical deflector,
wherein said optical deflector includes a rotatable polygonal mirror configured to deflect the light beam,
wherein a radius of a shaft hole which is provided in said rotatable polygonal mirror is larger than a radius of a rotation shaft of the optical deflector which is inserted in said shaft hole,
wherein a center of the rotation shaft is made eccentric with respect to a center of the shaft hole, and
wherein said controller identifies one of plural reflecting surfaces of said rotatable polygonal mirror as a reference surface by using a period of light beam detection signals from light beams reflected by two consecutive reflecting surfaces with respect to a rotational direction of said rotatable polygonal mirror.

7. The image forming apparatus according to claim 6, wherein said controller sets correction values corresponding to the respective reflecting surfaces, and wherein said apparatus forms an image in accordance with the correction values.

8. An image forming apparatus comprising:
an optical scanning unit configured to scan a photosensitive member with a light beam, wherein said optical scanning unit includes a rotatable polygonal mirror configured to deflect the light beam emitted from a light source and a detecting portion configured to detect the light beam deflected by said rotatable polygonal mirror; and
a controller configured to control, on the basis of a detected signal by said detecting portion, a scanning start position of the photosensitive member with the light beam deflected by said rotatable polygonal mirror,
wherein a rotation center of said rotatable polygonal mirror is made eccentric with respect to a center of gravity of said rotatable polygonal mirror by an eccentricity amount of 7.5 μm or more, and
wherein said controller controls the scanning start position by using a period of light beam detection signals from light beams reflected by two consecutive reflecting surfaces with respect to a rotational direction of said rotatable polygonal mirror.

9. The image forming apparatus according to claim 8, wherein said controller sets correction values corresponding to the respective reflecting surfaces, and wherein said apparatus forms an image in accordance with the correction values.

10. The image forming apparatus according to claim 8, wherein the eccentricity amount is 7.5 μm or more to 250 μm or less.

* * * * *